United States Patent
Sekine

(10) Patent No.: US 8,081,833 B2
(45) Date of Patent: Dec. 20, 2011

(54) COLOR PROCESSING APPARATUS AND METHOD TO CONVERT SPECTRAL INFORMATION

(75) Inventor: Hisato Sekine, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 679 days.

(21) Appl. No.: 12/208,202

(22) Filed: Sep. 10, 2008

(65) Prior Publication Data

US 2009/0067739 A1   Mar. 12, 2009

(30) Foreign Application Priority Data

Sep. 12, 2007   (JP) .................................. 2007-237259

(51) Int. Cl.
*G06K 9/40* (2006.01)
*G06K 9/00* (2006.01)

(52) U.S. Cl. ...................................................... 382/254

(58) Field of Classification Search .................. 382/162, 382/164, 165, 167, 173, 254; 345/589, 597, 345/600–604; 358/1.9, 3.24, 504, 515, 518, 358/523, 525, 530; 348/188, 222.1, 223.1
See application file for complete search history.

(56) References Cited

U.S. PATENT DOCUMENTS

| | | | | |
|---|---|---|---|---|
| 5,319,472 A * | 6/1994 | Hill et al. ....................... | 358/500 |
| 6,698,860 B2 | 3/2004 | Berns | |
| 6,952,494 B2 * | 10/2005 | Odagiri et al. ................. | 382/162 |
| 7,116,336 B2 * | 10/2006 | Van Aken et al. ............. | 345/589 |
| 7,158,144 B2 * | 1/2007 | Shiraiwa et al. .............. | 345/589 |
| 7,265,781 B2 * | 9/2007 | Noguchi ..................... | 348/223.1 |
| 7,436,995 B2 * | 10/2008 | Ito et al. ......................... | 382/162 |
| 7,626,728 B2 * | 12/2009 | Itagaki et al. .................. | 358/1.9 |
| 7,652,789 B2 * | 1/2010 | Berns et al. .................... | 358/1.9 |
| 7,952,757 B2 * | 5/2011 | Kaneko et al. ................. | 358/1.9 |
| 2009/0067739 A1 * | 3/2009 | Sekine .......................... | 382/254 |
| 2010/0014753 A1 * | 1/2010 | Tsuruoka ...................... | 382/165 |

FOREIGN PATENT DOCUMENTS

| | | |
|---|---|---|
| JP | 2002-254708 A | 9/2002 |
| JP | 2003-326768 A | 11/2003 |
| JP | 2005-508125 A | 3/2005 |
| JP | 2007-060421 A | 3/2007 |

OTHER PUBLICATIONS

Spectral Reproduction using LabPQR: Inverting the Fractional-Area-Coverage-to-Spectra Relationship, International Congress of Imaging Science, U.S.A., Imaging Science and Technology, pp. 107-110, 2002.

* cited by examiner

*Primary Examiner* — Amir Alavi

(57) ABSTRACT

A color processing apparatus for converting input spectral color data into output color component data corresponding to an output device is provided. A first conversion unit converts the input spectral color data into color component data, and converts the converted color component data into first output color component data corresponding to the output device. A second conversion unit converts the input spectral color data into second output color component data using a calculation unit which calculates spectral color data from output color component data. An evaluation unit evaluates the first output color component data converted by the first conversion unit. A control unit controls to output one of the first and second output color component data in accordance with the evaluation result of the evaluation unit.

9 Claims, 9 Drawing Sheets

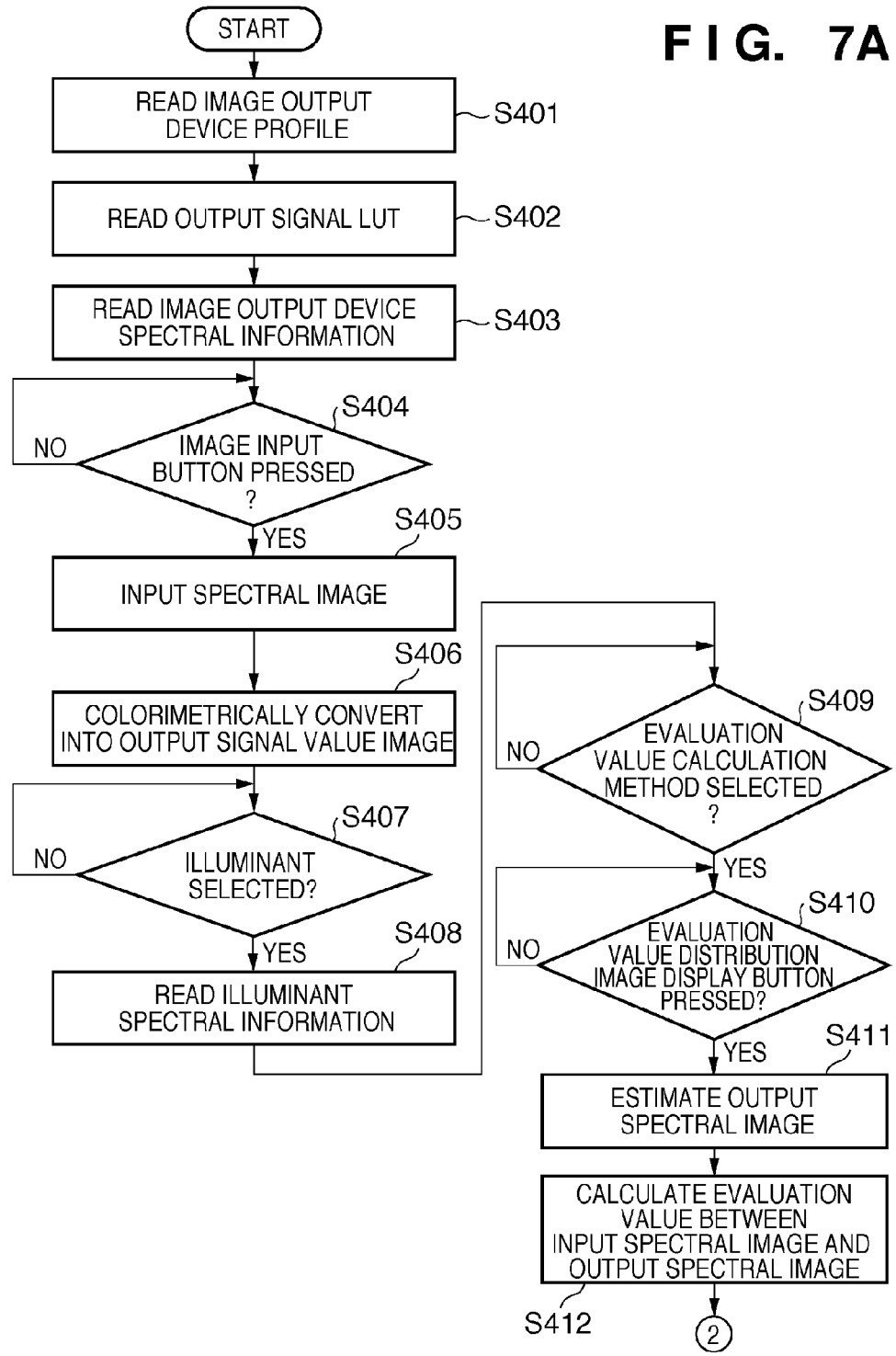

COLOR PROCESSING APPARATUS AND METHOD TO CONVERT SPECTRAL INFORMATION

BACKGROUND OF THE INVENTION

1. Field of the Invention

The present invention relates to a color processing apparatus and method and, more particularly, to a color processing apparatus and method, which convert input spectral information into an output signal value of an image output device.

2. Description of the Related Art

In recent years, in the field of color reproduction techniques that attain color reproduction of target objects, a spectral based color reproduction technique has been studied and developed. The spectral based color reproduction technique reproduces spectral information itself as physical information of the colors of a target object unlike a conventional colorimetric color reproduction technique that matches XYZ values, L*a*b* values, or the like to the color of a target object to adjust color based on metamerism. That is, when spectral based color reproduction is applied, the color of a target object can be faithfully reproduced independently of illumination environments upon observing the target object, personal differences of human visual characteristics, and the like, as if the target object were in the face of a user. Therefore, this color reproduction technique is expected to be widely applied to the fields that require faithful color reproduction of target objects, for example, in the fields such as the medical field, digital archiving of arts, on-line shopping and industrial design using the Internet, and the like.

As a technique for acquiring spectral information of a target object, a multi-band camera using color filters of four or more bands has been developed. By capturing an image of the target object using this multi-band camera, a spectral image each pixel of which has spectral information can be acquired.

On the other hand, as a technique for outputting the spectral image, a technique for calculating an output signal value of an image output device by applying optimization to spectral information of each pixel of an input image is known (for example, see PCT(WO) No. 2005-508125 (patent reference 1)). Also, a method of creating a lookup table (LUT) by analyzing spectral information of an input image, and converting the spectral information into an output signal value of an image output device while preserving the spectral information is available (for example, see Japanese Patent Laid-Open No. 2002-254708 (patent reference 2)). In addition, a method of attaining color reproduction using an LabPQR space defined by adding spectral information to tristimulus value information in the conventional colorimetric color reproduction is proposed.

However, when a spectral image is converted into output signal values of an image output device and the converted output signal values are to be output, a processing time required to convert the spectral image into the output signal values poses a problem in addition to reproduction precision of the input spectral information.

For example, when the output pixel value of the image output device is calculated by applying optimization processing to each pixel like the technique described in patent reference 1, the reproduction precision of spectral information can be improved. However, since the optimization processing is applied to all pixels, a very long processing time is required.

According to the technique described in patent reference 2, by creating an LUT for converting spectral information of an input image into output signal values of an output device while temporarily holding the spectral information, high-speed conversion into output signal values of the output device can be attained. However, when a different image is input, an LUT needs to be created again, thus consequently requiring a processing time to create an LUT.

Furthermore, when the LabPQR space defined by adding spectral information to tristimulus value information is used like in the technique described in non-patent reference 1, relatively high-speed conversion processing can be accomplished. However, the reproduction precision of spectral information is impaired.

As described above, according to the conventional spectral based color reproduction techniques, the color reproduction precision and processing time have a tradeoff relationship, and it is difficult to improve both of them.

SUMMARY OF THE INVENTION

The present invention has been made to solve the aforementioned problems, and has as its object to provide a color processing apparatus and method, which execute conversion processing into output signal values of an image output device at high speed without impairing the reproduction precision of an input spectral image.

According to one aspect of the present invention, a color processing apparatus for converting input spectral color data into output color component data corresponding to an output device is provided. A first conversion unit converts the input spectral color data into color component data, and converts the converted color component data into first output color component data corresponding to the output device. A second conversion unit converts the input spectral color data into second output color component data using a calculation unit which calculates spectral color data from output color component data. An evaluation unit evaluates the first output color component data converted by the first conversion unit. A control unit controls to output one of the first and second output color component data in accordance with the evaluation result of the evaluation unit.

Further features and aspects of the present invention will become apparent from the following description of exemplary embodiments with reference to the attached drawings.

BRIEF DESCRIPTION OF THE DRAWINGS

FIGS. 7A-B are flowcharts showing processing for converting an input image into output signal values according to the second embodiment.

DESCRIPTION OF THE EMBODIMENTS

Various exemplary embodiments, features, and aspects of the present invention will be described in detail below with reference to the drawings.

First Embodiment

Apparatus Arrangement

Figure 1:
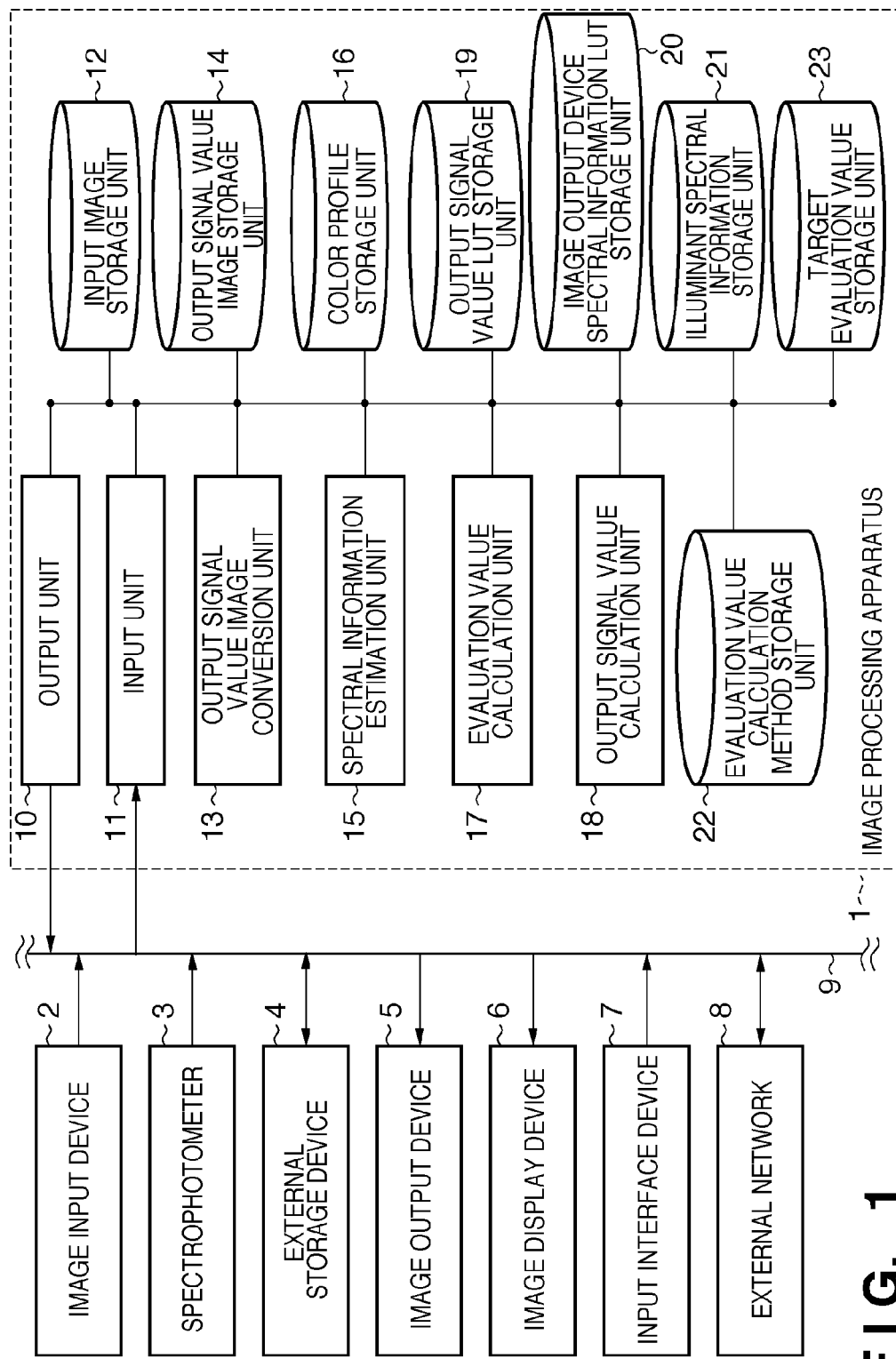
FIG. 1 is a block diagram showing the arrangement of an image processing apparatus according to one embodiment of the present invention.

FIG. 1 is a block diagram showing the arrangement of an image processing apparatus as one embodiment according to the present invention. Note that an image processing apparatus of this embodiment is implemented in practice when a computer apparatus as a server apparatus or client apparatus that configures an image processing system reads and executes a program as a characteristic feature of this embodiment. Note that the server or client apparatus that implements this embodiment may be implemented by a single computer apparatus or may be implemented by distributing functions to a plurality of computer apparatuses as needed. When the server or client apparatus is implemented by a plurality of computer apparatuses, these computer apparatuses are connected via a Local Area Network (LAN) or the like to be able to communicate with each other.

Referring to FIG. 1, reference numeral 1 denotes a computer apparatus which executes a characteristic operation of this embodiment. This computer apparatus will be referred to as an image processing apparatus hereinafter.

To the image processing apparatus 1, various units are connected via a system bus 9 to be able to communicate with the apparatus 1. For example, reference numeral 2 denotes an image input device such as a camera, scanner, or the like; 3, a spectrophotometer used to measure spectral information; 4, an external storage device such as a hard disk, CD-ROM, DVD-ROM, or the like; and 5, an image output device such as a printer, projector, or the like. Reference numeral 6 denotes an image display device such as a display or the like; 7, an input interface device such as a keyboard, mouse, or the like; and 8, an external network such as a LAN or the like.

In the image processing apparatus 1, reference numeral 10 denotes an output unit used to output image data to the image output device 5. Reference numeral 11 denotes an input unit used to input image data acquired by the image input device 2 and spectral information acquired by the spectrophotometer 3, and image data and spectral information from the external storage device 4 and external network 8. Reference numeral 12 denotes an input image storage unit used to store image data input by the input unit 11; and 13, an output signal value image conversion unit used to convert an input image stored in the input image storage unit 12 into an output signal value image. Reference numeral 14 denotes an output signal value image storage unit used to store the output signal value image converted by the output signal value image conversion unit 13; and 15, a spectral information estimation unit used to estimate spectral information from the output signal value image stored in the output signal value image storage unit 14 upon outputting that image using the image output unit 5. Reference numeral 16 denotes a color profile storage unit used to store color profile data of the image output device 5; and 17, an evaluation value calculation unit used to calculate an evaluation value between spectral information of an input image stored in the input image storage unit 12 and that estimated by the spectral information estimation unit 15. Reference numeral 18 denotes an output signal value calculation unit used to calculate an output signal value from spectral information; and 19, an output signal value LUT storage unit used to store an LUT that associates device RGB values with output signal values. Reference numeral 20 denotes an image output device spectral information LUT storage unit used to store an LUT that associates output signal values of the image output device 5 with spectral information to be output at that time; and 21, an illuminant spectral information storage unit used to store spectral information of an illuminant. Reference numeral 22 denotes an evaluation value calculation method storage unit used to store an evaluation value calculation method; and 23, an evaluation value storage unit used to store a target evaluation value.

Image Processing Overview

Processing for converting an input image into an output image by applying spectral based color reproduction to the input image in the image processing apparatus 1 of this embodiment with the aforementioned arrangement will be described below.

Figure 2A:
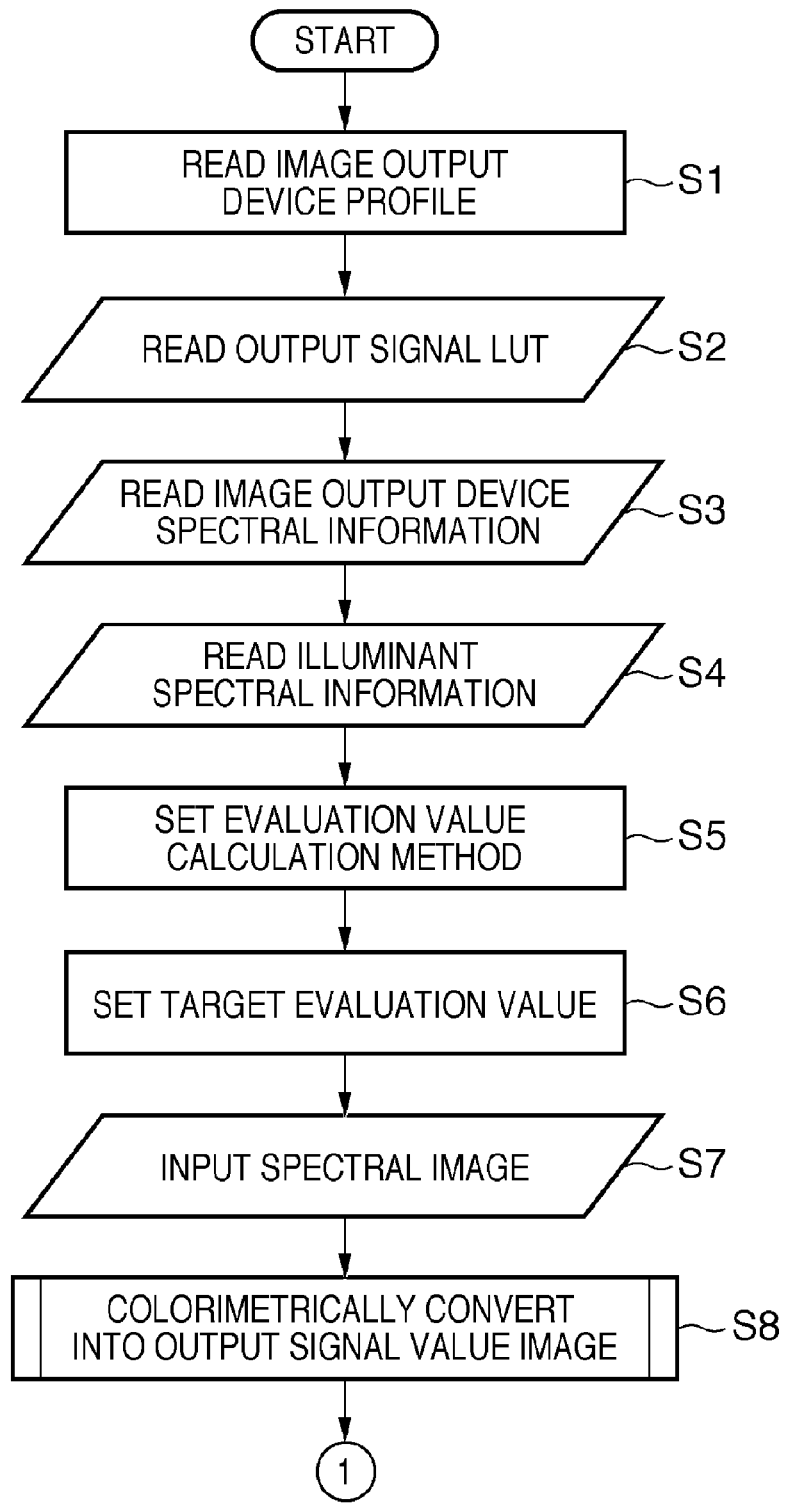
FIGS. 2A-B are flowcharts showing processing for converting an input image into output signal values according to the embodiment.
Figure 2B:
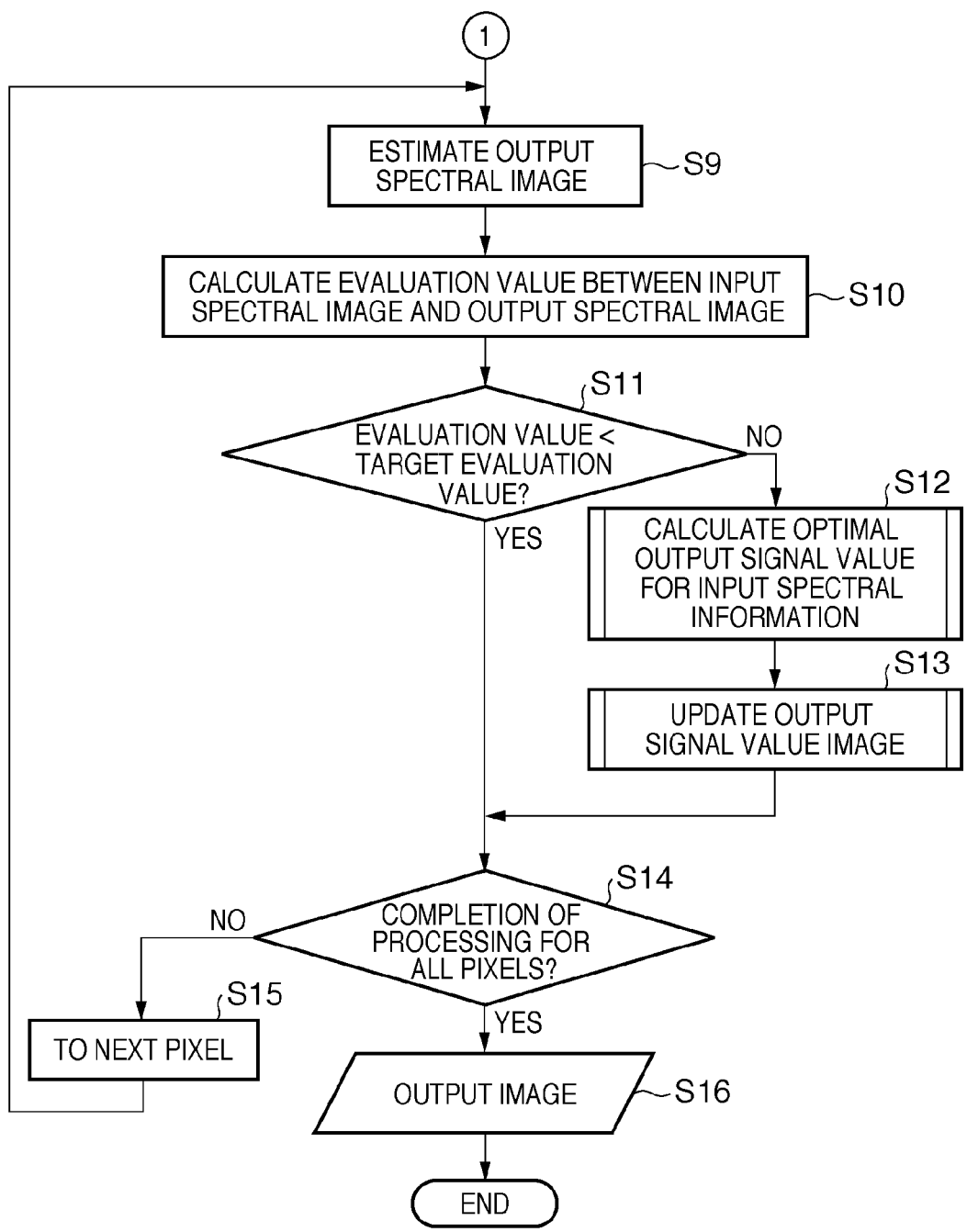

An overview of the processing will be described first with reference to FIGS. 2A-B. In the following description, assume that various data to be stored in the respective storage units in the image processing apparatus 1 are read by inputting them from any of the image input device 2, external storage device 4, and external network 8 via the input unit 11.

In step S1, color profile data of the image output device 5 is read, and is stored in the color profile storage unit 16. The color profile data of the image output device 5 is an LUT that associates an input color space with the device characteristics of the image output device based on the colorimetric color reproduction. This LUT is provided in the form of, for example, an ICC profile, and is an LUT that associates an input color space such as sRGB, AdobeRGB, or the like with an output color space such as device RGB or the like.

In step S2, an LUT that associates an output color space (e.g., device RGB values) and output signal values of the image output device 5 with each other is read, and is stored in the output signal value LUT storage unit 19. In step S3, an LUT that associates spectral information and output signal values of the image output device 5 with each other (to be referred to as an image output device spectral information LUT hereinafter) is read, and is stored in the image output device spectral information LUT storage unit 20. This image output device spectral information LUT is an LUT that associates spectral information of a color, which is output upon giving an output signal value to the image output device 5, with that output signal value. For example, assume that the image output device 5 is an ink-jet printer which has four color materials, that is, cyan, magenta, yellow, and black, and can output respective color material amounts in 256 levels from 0 to 255. In this case, patch images are output by the image output device 5 while changing the respective color material amounts at arbitrary intervals, and the spectral information of each patch image is measured using the spectrophotometer 3. Then, the obtained spectral information is associated with each color material amount, thus creating an image output device spectral information LUT. By changing the color material amounts at fine intervals, a high-precision LUT can be created. However, when the number of types of color materials increases, the data volume also becomes huge. Hence, it is practical to create an LUT using the number of data that can be measured in practice, and the number of levels required to maintain sufficiently high precision.

In step S4, the spectral information of an illuminant is read, and is stored in the illuminant spectral information storage unit 21.

In step S5, an evaluation value calculation method is stored in the evaluation value calculation method storage unit 22. Furthermore, in step S6 a target evaluation value is stored in the evaluation value storage unit 23. Details of these evaluation value calculation method and target evaluation value will be described later.

In step S7, a spectral image acquired by, for example, a multi-band camera is stored in the input image storage unit 12 as an input image. In step S8, the output signal value image conversion unit 13 applies colorimetric color conversion to the input image stored in the input image storage unit 12 to convert it into an output signal value image, and stores the output signal value image in the output signal value image storage unit 14. Details of this colorimetric conversion processing into the output signal value image will be described later.

Subsequent steps S9 to S15 form a processing loop for each pixel of the input image stored in the input image storage unit 12. That is, the processes in steps S9 to S15 are repeated for all pixels of the input image.

That is, in step S9 the spectral information estimation unit 15 estimates spectral information upon outputting using the image output device 5 from the output signal value of a pixel of interest. That is, the unit 15 estimates spectral information of an image to be output using the image output device 5 with high precision. As a technique for estimating spectral information from the output signal value with high precision, a Cellular Yule-Nielsen Spectral Neugebauer Model (to be abbreviated as a CYNSN model hereinafter) is known. Using the CYNSN model, output spectral information can be estimated with high precision from an output signal value based on the LUT of the image output device stored in the image output device spectral information LUT storage unit 20.

In step S10, the evaluation value calculation unit 17 calculates an evaluation value between the spectral information estimated in step S9 and that of the input image stored in the input image storage unit 12. It is checked in step S11 if the evaluation value calculated in step S10 is equal to or smaller than the target evaluation value stored in the evaluation value storage unit 23. If the calculated evaluation value is equal to or smaller than the target evaluation value, the process advances to step S14; if the calculated evaluation value exceeds the target evaluation value, the process advances to step S12.

In step S12, the output signal value calculation unit 18 calculates an optimal output signal value that minimizes the evaluation value from the spectral information corresponding to the input pixel. Details of this calculation processing will be described later. In step S13, the output signal value image stored in the output signal value image storage unit 14 is updated by the optimal output signal value calculated in step S12. In this way, in this embodiment, the output signal value of only a pixel whose evaluation value exceeds the target evaluation value is updated.

It is then checked in step S14 if the processing for all the pixels is complete. If the processing for all the pixels is complete, the process advances to step S16; if pixels to be processed still remain, the process advances to step S15 to process the next pixel.

In step S16, the output unit 10 outputs the output signal value image stored in the output signal value image storage unit 14 to the image output device 5, thus printing the output signal value image.

Evaluation Value Calculation Method

The evaluation value calculation method set in step S5 will be described below.

The evaluation value in this embodiment is a value indicating how much identical two target colors are, that is, the degree of matching. As the evaluation value is smaller, the degree of matching becomes higher. For example, as a method of evaluating a spectral waveform proximity, a method of evaluating a Root Mean Square error (to be abbreviated as an RMS error hereinafter) in the visible light range (380 nm to 730 nm) of light wavelengths is known. As an evaluation method of a color to be perceived, a method of exploiting color differences such as CIEΔE, CIEΔE94, CIEΔE2000, and the like is available.

However, the evaluation method using RMS errors and that using color differences suffer the following problems. That is, as for an RMS error, even when the RMS error between two target colors is reduced, their color difference does not always become small. That is, the RMS error does not always have a high correlation with an error perceived by a person. The evaluation method using color differences is premised on that two target colors are observed under an identical illuminant. For this reason, even when the color difference between these two colors is smallest under a certain illuminant, it is not always smallest under another illuminant.

Hence, in order to solve these problems, this embodiment uses an evaluation method that can evaluate both the spectral proximity and color difference to be perceived between two colors. For example, an evaluation method using weighted RMS errors that reflect perception sensitivity by, for example, preponderantly calculating RMS errors of a range with high perception sensitivity in the visible light range of light wavelengths, an evaluation method using a mean color difference under a plurality of illuminants, and so forth may be used. When a person observes an image, he or she does not gaze only a pixel of interest, but recognizes the image based on the correlation with surrounding pixels around the pixel of interest. Hence, using an S-CIELAB evaluation method exploiting the human visual characteristics, an image can be evaluated more effectively.

In step S5, an optimal evaluation method (i.e., the evaluation value calculation method) of those described above is set as usage. That is, an optimal evaluation method can be set according to purposes of images or image features. For example, the evaluation method may be fixedly set in advance, or may be set as needed using a predetermined UI window. An optimal evaluation method can be automatically set based on the analysis result of image features.

Target Evaluation Value

The target evaluation value set in step S6 will be described below.

As the target evaluation value in this embodiment, an appropriate value is set according to the evaluation value calculation method set in step S5. For example, a case will be examined below wherein the evaluation value calculation method set in step S5 is a method of calculating a mean color difference under various illuminants. In this case, if the color difference is smaller than "3" in general, since two colors can be considered as an identical color to some extent, the target evaluation value is set to be "3" upon aiming at generally sufficiently high reproduction precision. In order to execute color reproduction with higher precision, since the color difference needs to be smaller than "1" as a level at which a person cannot distinguish a difference between colors, the target evaluation value is set to be "1" in this case. This target evaluation value may also be fixedly set in advance, or may be set as needed using a predetermined UI window. Also, an optimal target evaluation value may be automatically set based on the analysis result of image features.

Output Signal Value Image Conversion (S8)

Figure 3:
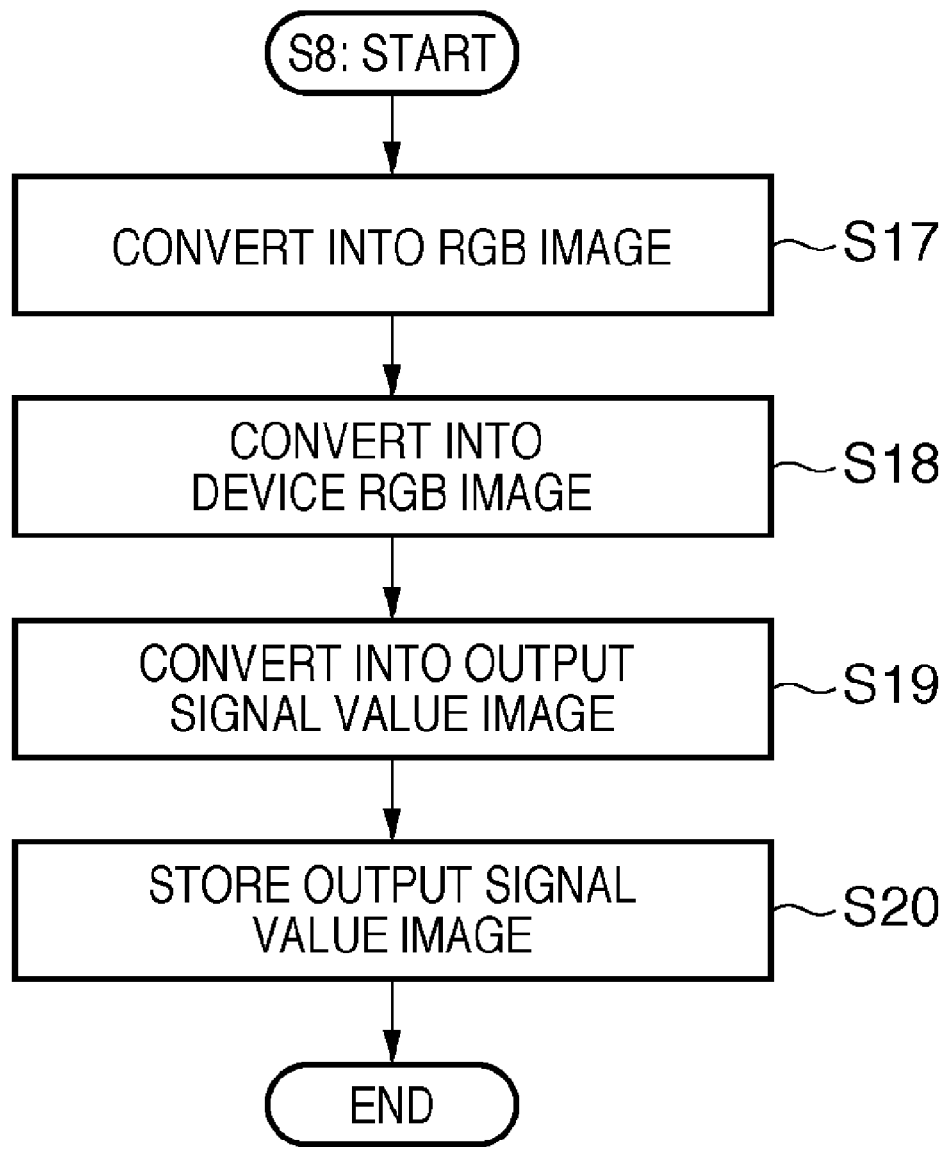
FIG. 3 is a flowchart showing colorimetric conversion processing into an output signal value image according to the embodiment.

The colorimetric conversion processing into an output signal value image in step S8 will be described in detail below with reference to the flowchart of FIG. 3.

In step S17, the input image as a spectral image stored in the input image storage unit 12 is converted into an RGB image using the illuminant spectral information stored in the illuminant spectral information storage unit 21. The following equation group describes a practical example of conversion into sRGB (R', G', B') using the spectral information of the input image and the illuminant spectral information. Note that since an illuminant in sRGB is CIE standard light D65, E(λ) in the following equation group is the spectral radiance of the CIE standard light D65.

$$X = k \int_{380}^{730} O(\lambda) E(\lambda) \bar{x}(\lambda) \, d\lambda$$

-continued $$Y = k \int_{380}^{730} O(\lambda)E(\lambda)\bar{y}(\lambda)d\lambda$$

$$Z = k \int_{380}^{730} O(\lambda)E(\lambda)\bar{z}(\lambda)d\lambda$$

$$k = \frac{1}{\int_{380}^{730} E(\lambda)\bar{y}(\lambda)d\lambda}$$

where O(λ): the spectral reflectance data of an image
E(λ): the spectral radiance of an illuminant
$\bar{x}(\lambda), \bar{y}(\lambda),$ and $\bar{z}(\lambda)$: color-matching functions specified by CIE (Commission International de l'Eclairage)
R=3.5064X−1.7400Y−0.5441Z
G=−1.0690X+1.9777Y+0.0352Z
B=0.0563X−0.1970Y+1.0511Z
$R'=R^{1/2.2}$
$G'=G^{1/2.2}$
$B'=B^{1/2.2}$ In step S18, the RGB image converted in step S17 is converted into a device RGB image of the image output device 5 using the color profile stored in the color profile storage unit 16. In step S19, the device RGB image converted in step S18 is converted into an output signal value image using the output signal value LUT stored in the output signal value LUT storage unit 19. In step S20, the output signal value image converted in step S19 is stored in the output signal value image storage unit 14.

Calculation of Optimal Output Signal Value (S12)

Figure 4:
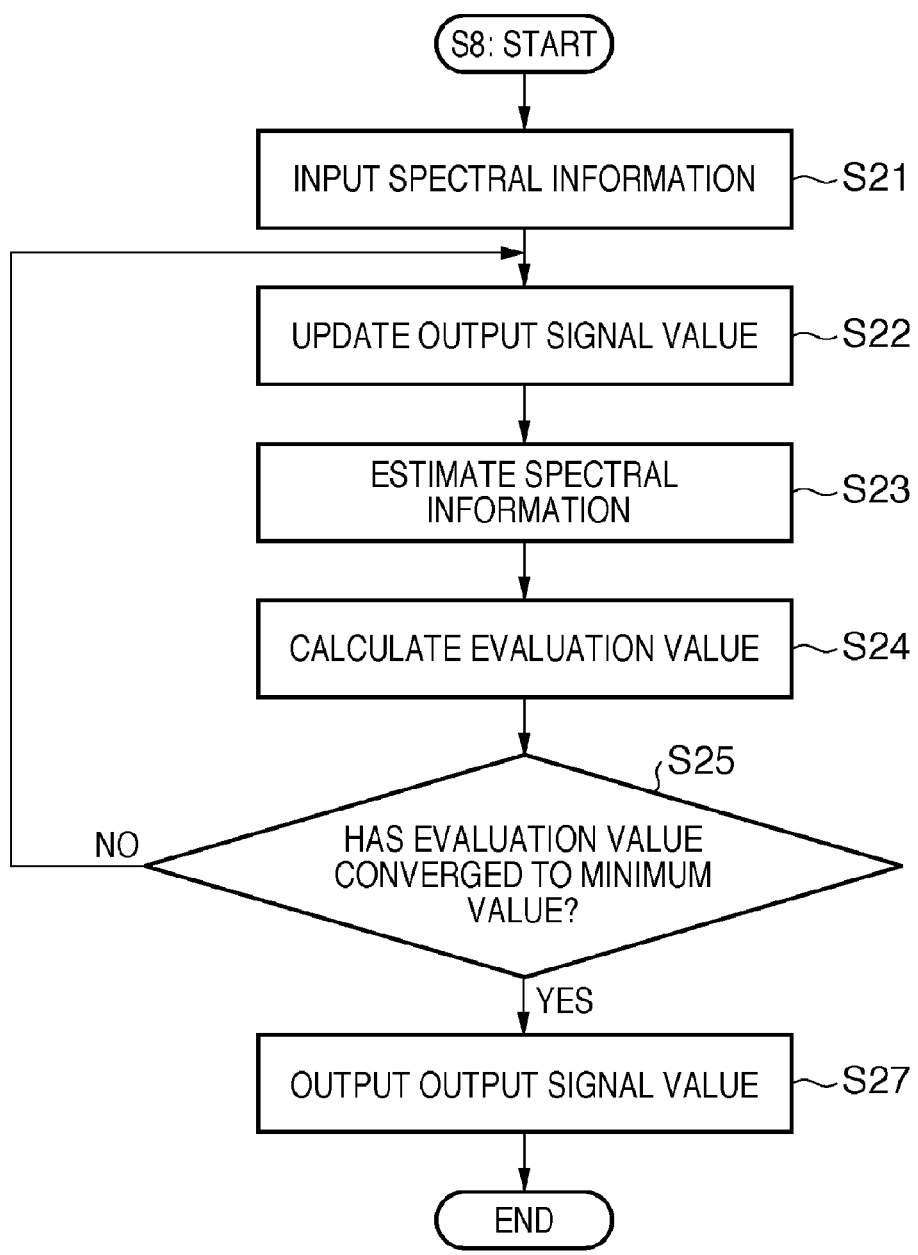
FIG. 4 is a flowchart showing calculation processing of an optimal output signal value according to the embodiment.

The calculation processing of an optimal output signal value in step S12 will be described in detail below with reference to the flowchart of FIG. 4. This processing is executed by the output signal value calculation unit 18.

In step S21, spectral information of a pixel of interest of the input image stored in the input image storage unit 12 is input.

Subsequent steps S22 to S25 form a processing loop for converging an evaluation value to a minimum value. That is, the processes in steps S22 to S25 are repeated until the calculated evaluation value converges to a minimum value.

In step S22, an output signal value is updated. As this update method, by applying an optimization method such as a Newton method, linear programming, DLS method, or the like, an output signal value that minimizes an evaluation value can be obtained within a relatively short period of time.

In step S23, the spectral information estimation unit 15 estimates spectral information based on the updated output signal value. In step S24, the evaluation value calculation unit 17 calculates an evaluation value between the spectral information estimated in step S23 and the input spectral information.

If it is determined as a result of repetition of the processes in steps S23 to S25 that the evaluation value has converged to a minimum value, the process advances to step S27. Note that whether or not the evaluation value has converted to a minimum value is determined based on the optimization method applied to update the output signal value in step S22.

In step S27, the optimal output signal value which is calculated by the loop processing of steps S22 to S25 and minimizes the evaluation value is output.

As described above, according to this embodiment, an input image is converted by the conventional colorimetric color reproduction using an ICC profile or the like, and output spectral information is estimated. Only when an evaluation value with input spectral information is large, an output signal value is optimized by re-calculation. That is, only pixels with large spectral information differences are re-calculated, thus greatly reducing the overall calculation volume, and achieving both high-speed processing and high-precision color reproduction.

Second Embodiment

The second embodiment according to the present invention will be described hereinafter. The second embodiment is characterized in that evaluation values of spectral information between input and output images are visualized to allow the user to directly designate pixels with largely different evaluation values, thus re-calculating the output values as in the first embodiment.

Apparatus Arrangement

Figure 5:
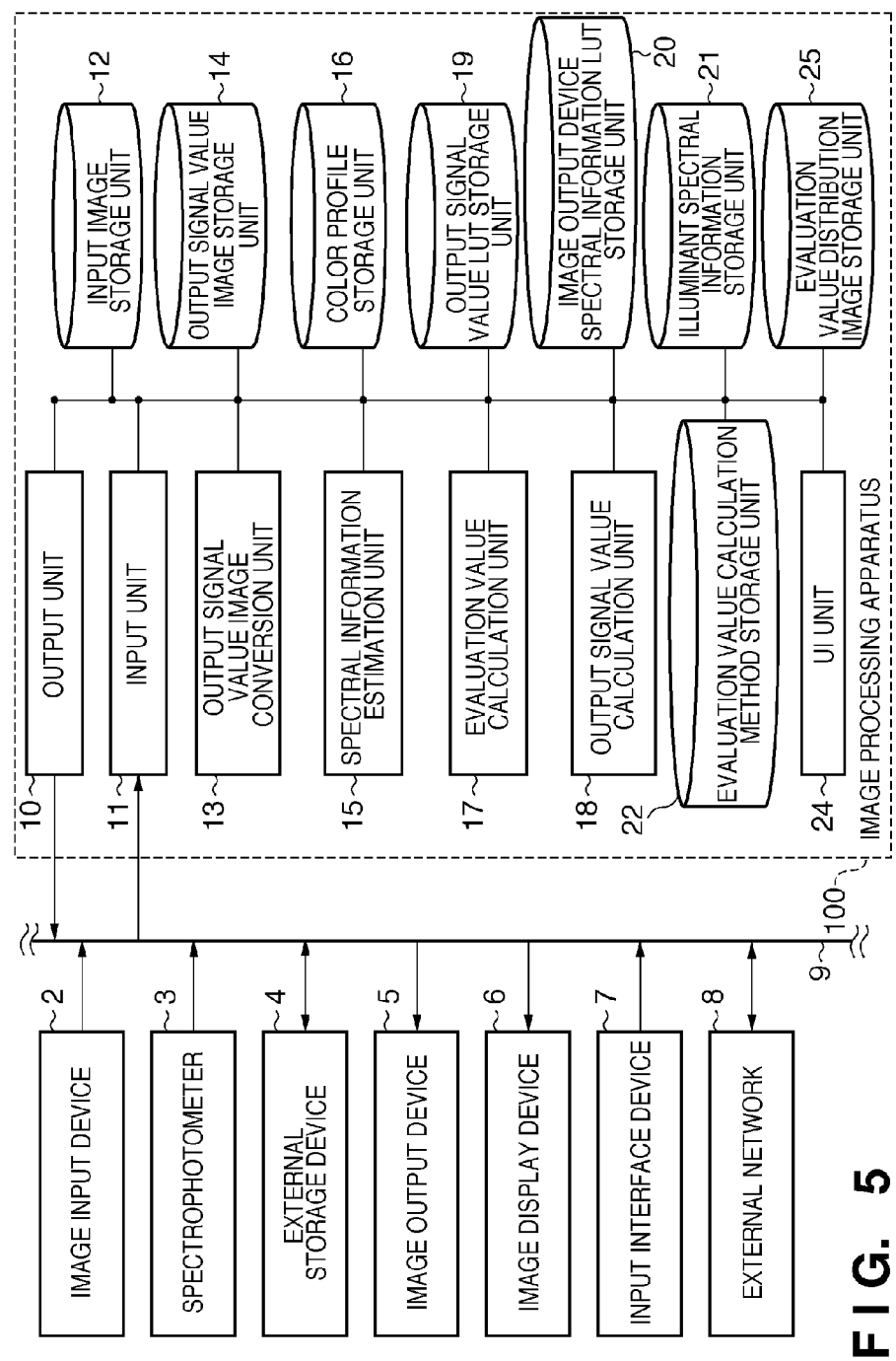
FIG. 5 is a block diagram showing the arrangement of an image processing apparatus according to the second embodiment of the present invention.

FIG. 5 is a block diagram showing the arrangement of a system which comprises an image processing apparatus 100 according to the second embodiment. The same reference numerals in FIG. 5 denote the same parts as in the arrangement shown in FIG. 1 of the aforementioned first embodiment, and a repetitive description thereof will not be repeated. That is, only components different from FIG. 1 of the first embodiment will be explained below.

In the image processing apparatus 100 shown in FIG. 5, reference numeral 24 denotes a UI unit used to display a user interface on an image display device 6; and 25, an evaluation value distribution image storage unit used to store evaluation values calculated by an evaluation value calculation unit 17 as an image. Other components in the image processing apparatus 100 are the same as those in the image processing apparatus 1 of the aforementioned first embodiment.

User Interface

Figure 6:
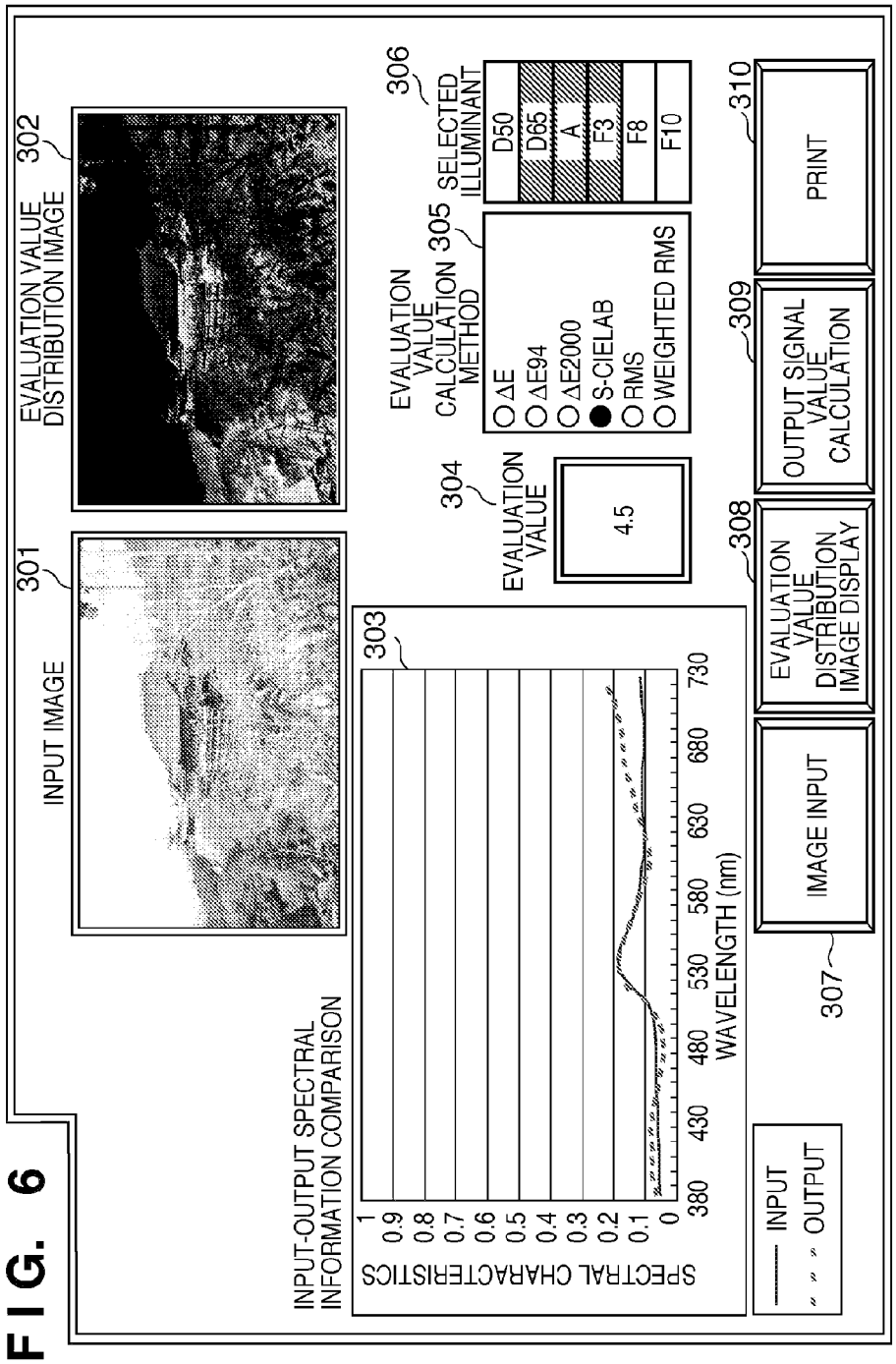
FIG. 6 is a view showing an example of a user interface according to the second embodiment.

FIG. 6 shows an example of a user interface to be displayed on the image display device 6 by the UI unit 24. In FIG. 6, reference numeral 301 denotes an input image display area which displays a thumbnail of an input image stored in an input image storage unit 12. Reference numeral 302 denotes an evaluation value distribution image display area which displays a thumbnail of an evaluation value distribution image stored in the evaluation value distribution image storage unit 25. Note that the evaluation value distribution image is generated by calculating evaluation values for respective pixels of an input image stored in the input image storage unit 12 by the evaluation value calculation unit 17, and converting these evaluation values into a grayscale image depending on their magnitudes. In the second embodiment, the user can select or designate a desired image position (region) using a mouse or the like on the thumbnail of this evaluation value distribution image, and the selected image region undergoes re-calculation processing of output signal values.

Reference numeral 303 denotes a spectral information comparison display area which displays a graph of spectral information between input and output image at the selected image position upon reception of the user's selection or designation on the evaluation value distribution image display area 302. Reference numeral 304 denotes an evaluation value display area, which displays an evaluation value which is calculated by the evaluation value calculation unit 17 at the selected image position upon reception of the user's selection or designation on the evaluation value distribution image display area 302. Reference numeral 305 denotes an evaluation value calculation method selection area, which displays evaluation value calculation methods. The area 305 displays "ΔE", "ΔE94", "ΔE2000", "S-CIELAB", "RMS", and "weighted RMS" as examples of selectable evaluation value calculation methods.

Reference numeral 306 denotes a selected illuminant display area, which displays selectable illuminants used upon calculating the evaluation value. The area 306 displays CIE standard auxiliary light "D50", CIE standard light "D65", CIE standard light "A", and representative fluorescent lamps "F3", F8", and F10" as representative illuminant examples. The user can select a plurality of displayed illuminants using a pointing device or keyboard as an input interface device 7.

Reference numeral 307 denotes an image input button used to instruct the input image storage unit 12 to read an image. Reference numeral 308 denotes an evaluation value distribution image display button used to instruct to display an evaluation value distribution image stored in the evaluation value distribution image storage unit 25 on the evaluation value distribution image display area 302. Reference numeral 309 denotes an output signal calculation button used to give the instruction to start the output signal value calculation processing for the image position selected or designated by the user on the evaluation value distribution image display area 302. Reference numeral 310 denotes a print button used to instruct an image output device 5 to print an output signal value image stored in an output signal value image storage unit 14.

Image Processing Overview

Figure 7B:
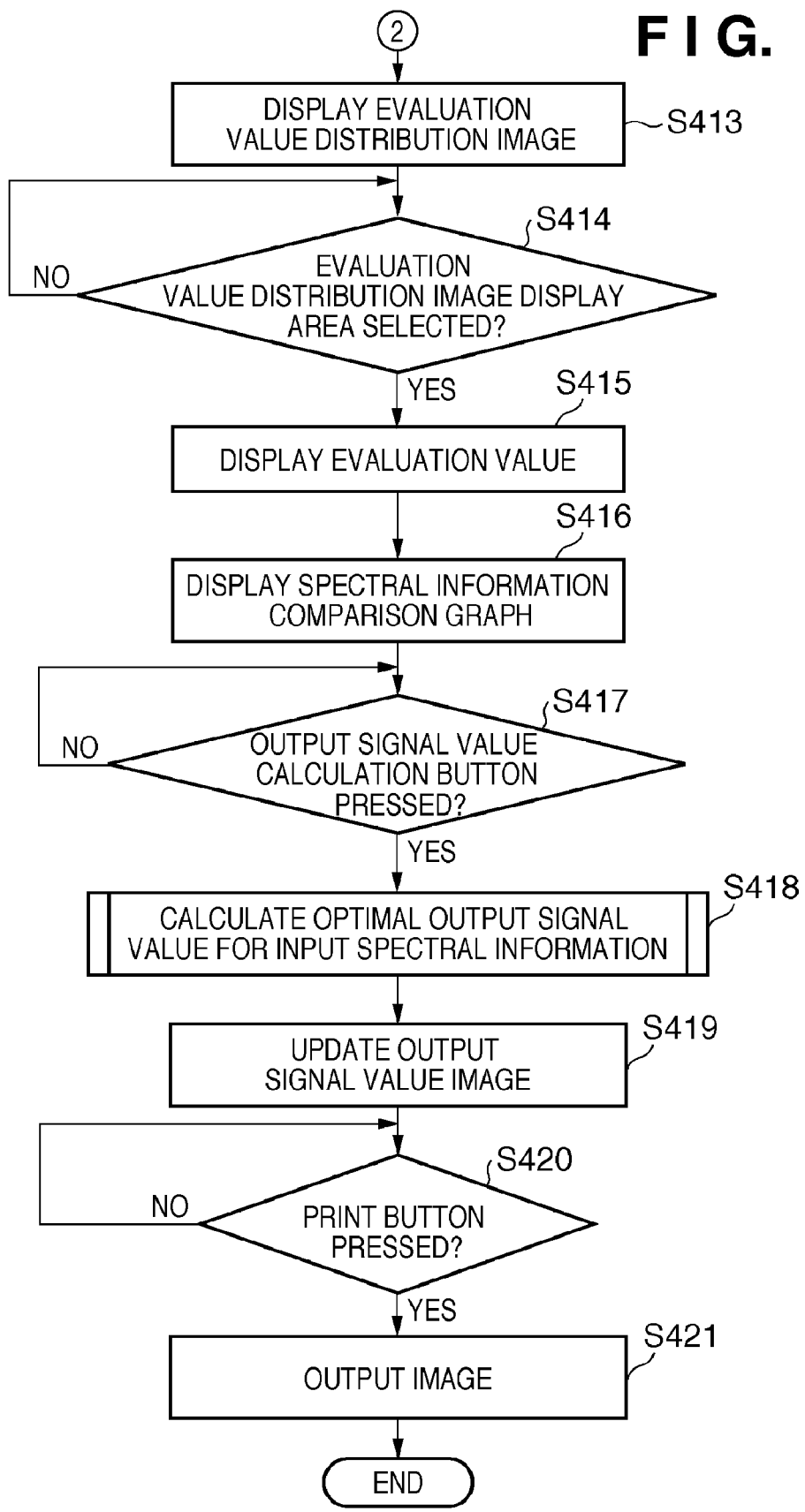

Processing for converting an input image into an output image by applying spectral based color reproduction to the input image in the image processing apparatus 100 of the second embodiment with the aforementioned arrangement will be described below with reference to the flowcharts of FIGS. 7A-B.

In step S401, color profile data of the image output device 5 is read, and is stored in a color profile storage unit 16. In step S402, an LUT that associates device RGB values of the image output device 5 with output signal values is read, and is stored in an output signal value LUT storage unit 19. In step S403, an LUT that associates spectral information of the image output device 5 with output signal values (to be referred to as image output device spectral information LUT hereinafter) is read, and is stored in an image output device spectral information LUT storage unit 20.

In step S404, the control waits until the user presses the image input button 307. That is, it is determined in this step if the user clicks or designates the image input button 307 using the pointing device or keyboard as the input interface device 7. Assume that an instruction issued by pressing each button on the UI window shown in FIG. 6 is issued by the same operation as that for this image input button 307.

If the user presses the image input button 307, the process advances to step S405 to control an input unit 11 to input an image designated by the user from any of an image input device 2, external storage device 4, or external network 8, and to store the input image in the input image storage unit 12. In step S406, the input image stored in the input image storage unit 12 is converted into an output signal value image by an output signal value image conversion unit 13, and the output signal value image is stored in the output signal value image storage unit 14, as in step S8 of the first embodiment.

In step S407, the control waits until the user selects at least one illuminant on the selected illuminant display area 306. If the user selects an illuminant, the process advances to step S408 to control the input unit 11 to read spectral information of the illuminant designated by the user from the image input device 2, external storage device 4, or external network 8, and to store it in an illuminant spectral information storage unit 21. If the user selects a plurality of illuminants in step S407, all pieces of spectral information of all the selected illuminants are stored in the illuminant spectral information storage unit 21.

In step S409, the control waits until the user selects the evaluation value calculation method on the evaluation value calculation method selection area 305, and the selected evaluation value calculation method is stored in an evaluation value calculation method storage unit 22. In step S410, the control waits until the user presses the evaluation value distribution image display button 308. If the user presses this button, the process advances to step S411, and a spectral information estimation unit 15 estimates an output spectral image as in step S9 of the aforementioned first embodiment.

In step S412, the evaluation value calculation unit 17 calculates evaluation values between the spectral image estimated in step S411 and the input image stored in the input image storage unit 12, and stores them as an evaluation value distribution image in the evaluation value distribution image storage unit 25. In step S413, the evaluation value distribution image stored in the evaluation value distribution image storage unit 25 is displayed on the evaluation value distribution image display area 302.

In step S414, the control waits for the user selects an image position on the evaluation value distribution image display area 302. If the user selects an image position, the evaluation value of the selected image position is displayed on the evaluation value display area 304 in step S415. In step S416, a graph of spectral information of the input image and that calculated by the spectral information estimation unit 15 is generated in association with the image position selected in step S414, and is displayed on the spectral information comparison display area 303.

In step S417, the control waits until the user presses the output signal value calculation button 309. If the user presses the output signal value calculation button 309, the process advances to step S418, and the output signal value calculation unit 18 calculates an optimal output signal value that minimizes the evaluation value as in step S12 of the first embodiment. In step S419, the output signal value image stored in the output signal value image storage unit 14 is updated using the optimal output signal value calculated in step S418.

In step S420, the control waits for until the user presses the print button 310. If the user presses the print button 310, the process advances to step S421 to output the output signal value image stored in the output signal value image storage unit 14 by an output unit 10, thus printing the output signal value image on a print sheet using the image output device 5.

As described above, according to the second embodiment, the user selects the evaluation value calculation method and illuminant, and can apply optimization to only a required part while evaluating a processed image. In the flowchart shown in FIGS. 7A-B, a plurality of event waiting processes (S404, S407, S409, S410, S414, S417, and S412) is executed on the UI window shown in FIG. 6. However, these event waiting processes are not always executed at the timings as described in the flowchart, and the processes jump to corresponding processing steps as needed depending on arbitrary event generation timings.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention can be implemented by a computer, the program code installed in the computer also implements the present invention. In other words, the present invention also covers a computer program for the purpose of implementing the functions of the present invention.

In this case, so long as the system or apparatus has the functions of the program, the program may be executed in any form, such as an object code, a program executed by an interpreter, or script data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-237259, filed Sep. 12, 2007, which is hereby incorporated by reference herein in its entirety.

What is claimed is:

1. A color processing apparatus for converting input spectral color data into output color component data corresponding to an output device, comprising:
   at least one processor coupled via a bus to a memory, the processor being programmed to control one or more of:
   a first conversion unit configured to convert the input spectral color data into color component data, and to convert the converted color component data into first output color component data corresponding to the output device;
   a second conversion unit configured to convert the input spectral color data into second output color component data using a calculation unit which calculates spectral color data from output color component data;
   an evaluation unit configured to evaluate the first output color component data converted by the first conversion unit; and
   a control unit configured to control to output one of the first and second output color component data in accordance with an evaluation result of the evaluation unit.

2. The apparatus according to claim 1, wherein the first conversion unit converts the color component data into the first output color component data using a color profile.

3. The apparatus according to claim 1, wherein the calculation unit has a table which associates output color component data of the output device with output spectral color data, and the second conversion unit converts the input spectral color data into the second output color component data using the table.

4. The apparatus according to claim 1, wherein the evaluation unit evaluates the first output color component data converted by the first conversion unit using a weighted RMS error that reflects perception sensitivity in the visible light range.

5. The apparatus according to claim 1, wherein the evaluation unit evaluates the first output color component data converted by the first conversion unit using a mean color difference under a plurality of illuminants.

6. The apparatus according to claim 1, wherein the evaluation unit evaluates the first output color component data converted by the first conversion unit using a correlation between a pixel of interest and surrounding pixels.

7. The apparatus according to claim 1, wherein the input spectral color data is spectral color data acquired by a multiband camera.

8. A non-transitory computer-readable storage medium storing a program for making a computer function as an image processing apparatus according to claim 1 when the program is executed by the computer.

9. A color processing method for converting input spectral color data into output color component data corresponding to an output device, comprising:
   at least one processor coupled via a bus to a memory, the processor being programmed to perform the steps of:
   a first conversion step of converting the input spectral color data into color component data, and converting the converted color component data into first output color component data corresponding to the output device;
   a second conversion step of converting the input spectral color data into second output color component data using a calculation unit which calculates spectral color data from output color component data;
   an evaluation step of evaluating the first output color component data converted in the first conversion step; and
   a control step of controlling to output one of the first and second output color component data in accordance with a result of the evaluation step.

* * * * *